United States Patent
Kim et al.

(10) Patent No.: US 11,437,193 B2
(45) Date of Patent: Sep. 6, 2022

(54) MULTILAYER CERAMIC ELECTRONIC COMPONENT

(71) Applicant: SAMSUNG ELECTRO-MECHANICS CO., LTD., Suwon-si (KR)

(72) Inventors: Je Jung Kim, Suwon-si (KR); Do Yeon Kim, Suwon-si (KR); Min Hyang Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/782,598

(22) Filed: Feb. 5, 2020

(65) Prior Publication Data
US 2021/0020373 A1 Jan. 21, 2021

(30) Foreign Application Priority Data
Jul. 17, 2019 (KR) .................. 10-2019-0086400

(51) Int. Cl.
*H01G 4/30* (2006.01)
*H01G 2/06* (2006.01)
*H01G 4/12* (2006.01)
*H01G 4/012* (2006.01)

(52) U.S. Cl.
CPC ............ *H01G 4/30* (2013.01); *H01G 2/06* (2013.01); *H01G 4/012* (2013.01); *H01G 4/1218* (2013.01)

(58) Field of Classification Search
CPC .......... H01G 4/005; H01G 4/30; H01G 4/232; H01G 4/1218; H01G 2/06; H01G 4/012; H01G 4/01

USPC ............ 361/321.1, 321.2, 321.3, 303, 306.3, 361/301.4
See application file for complete search history.

(56) References Cited

U.S. PATENT DOCUMENTS

| 2003/0011962 A1* | 1/2003 | Yamamoto | H01G 4/30 361/321.2 |
|---|---|---|---|
| 2007/0133147 A1* | 6/2007 | Ritter | H01G 4/232 361/306.3 |
| 2012/0314338 A1* | 12/2012 | Togashi | H01G 4/30 361/306.3 |
| 2013/0093556 A1* | 4/2013 | Lim | H01F 17/0013 336/200 |

(Continued)

FOREIGN PATENT DOCUMENTS

| JP | 2003-282356 A | 10/2003 |
|---|---|---|
| JP | 2018-198327 A | 12/2018 |
| KR | 10-2016-0100701 A | 8/2016 |

*Primary Examiner* — Arun Ramaswamy
(74) *Attorney, Agent, or Firm* — Morgan, Lewis & Bockius LLP

(57) ABSTRACT

A multilayer ceramic electronic component includes a ceramic body including a dielectric layer, and first and second internal electrodes disposed to oppose each other with the dielectric layer therebetween; first and second external electrodes having first electrode layers connected to the first and second internal electrodes, respectively, and second electrode layers disposed on the first electrode layers, respectively; and an auxiliary electrode disposed between an end portion of each of the second electrode layers and an inflection point of the ceramic body, wherein a width of the auxiliary electrode is in a range of 20 to 70% of a width of a margin portion of the first or second internal electrode.

16 Claims, 16 Drawing Sheets

(56) References Cited

U.S. PATENT DOCUMENTS

| | | | |
|---|---|---|---|
| 2015/0014037 A1* | 1/2015 | Ahn | H05K 1/0231 |
| | | | 174/260 |
| 2015/0114700 A1* | 4/2015 | Park | H01G 4/012 |
| | | | 361/301.4 |
| 2015/0255213 A1* | 9/2015 | Lee | H01G 4/005 |
| | | | 174/258 |
| 2016/0240317 A1 | 8/2016 | Ro et al. | |

* cited by examiner

MULTILAYER CERAMIC ELECTRONIC COMPONENT

CROSS-REFERENCE TO RELATED APPLICATION

This application claims the benefit of priority to Korean Patent Application No. 10-2019-0086400 filed on Jul. 17, 2019 in the Korean Intellectual Property Office, the disclosure of which is incorporated herein by reference in its entirety.

TECHNICAL FIELD

The present disclosure relates to a multilayer ceramic electronic component, and more particularly, to a multilayer ceramic electronic component having excellent reliability.

BACKGROUND

In recent years, miniaturization, slimming, and multifunctionalization of electronic products have required the miniaturization of multilayer ceramic capacitors, and the mounting of multilayer ceramic capacitors may be also highly integrated.

A multilayer ceramic capacitor, an electronic component, may be mounted on the printed circuit boards of various electronic products and plays a role in charging or discharging electricity therein or therefrom, for example, a display device such as a liquid crystal display (LCD) and a plasma display panel (PDP), a computer, a personal digital assistant (PDA), a mobile phone, or the like, which may be mounted on the printed circuit boards of various electronic products, to charge or discharge electricity.

Such a multilayer ceramic capacitor may be used as a component of various electronic components, due to having a relatively compact size, a relatively high capacity, relative ease of mounting, and the like.

In the meantime, as interest in industry, in electric/electronic components has recently increased, multilayer ceramic capacitors have also been required to have high reliability and high capacity in order to be used in vehicles or infotainment systems.

Particularly, when the multilayer ceramic capacitor may be exposed to a harsh environment, the electrode may be peeled off due to oxidation of the external electrode, bending due to external force, and the like, and moisture and the like may penetrate and IR drop and/or a short circuit, or the like, may occur. In such a harsh environment, there may be a need to improve internal and external structures for improving moisture resistance and mechanical strength.

SUMMARY

An aspect of the present disclosure is to provide a multilayer ceramic electronic component excellent in terms of reliability for moisture resistance.

Another aspect of the present disclosure is to provide a multilayer ceramic electronic component having improved mechanical strength.

According to an aspect of the present disclosure, a multilayer ceramic electronic component includes a ceramic body including a dielectric layer, and first and second internal electrodes disposed to oppose each other with the dielectric layer therebetween, and including first and second surfaces opposing each other in a stacking direction of the first and second internal electrodes, third and fourth surfaces connected to the first and second surfaces and opposing each other, and fifth and sixth surfaces connected to the first and second surfaces, connected to the third and fourth surfaces, and opposing each other; first and second external electrodes having first electrode layers connected to the first and second internal electrodes, respectively, and second electrode layers disposed on the first electrode layers, respectively; and an auxiliary electrode disposed between an end portion of each of the second electrode layers and an inflection point of the ceramic body, wherein a width of the auxiliary electrode is in a range from 20% to 70% of a width of a margin portion of the first or second internal electrode.

BRIEF DESCRIPTION OF DRAWINGS

The above and other aspects, features, and advantages of the present disclosure will be more clearly understood from the following detailed description, taken in conjunction with the accompanying drawings, in which:

FIGS. 6A and 6B to 9A and 9B are be plan views respectively illustrating auxiliary electrodes applied to a multilayer ceramic electronic component according to each embodiments and modifications of the present disclosure.

DETAILED DESCRIPTION

Figure 1:
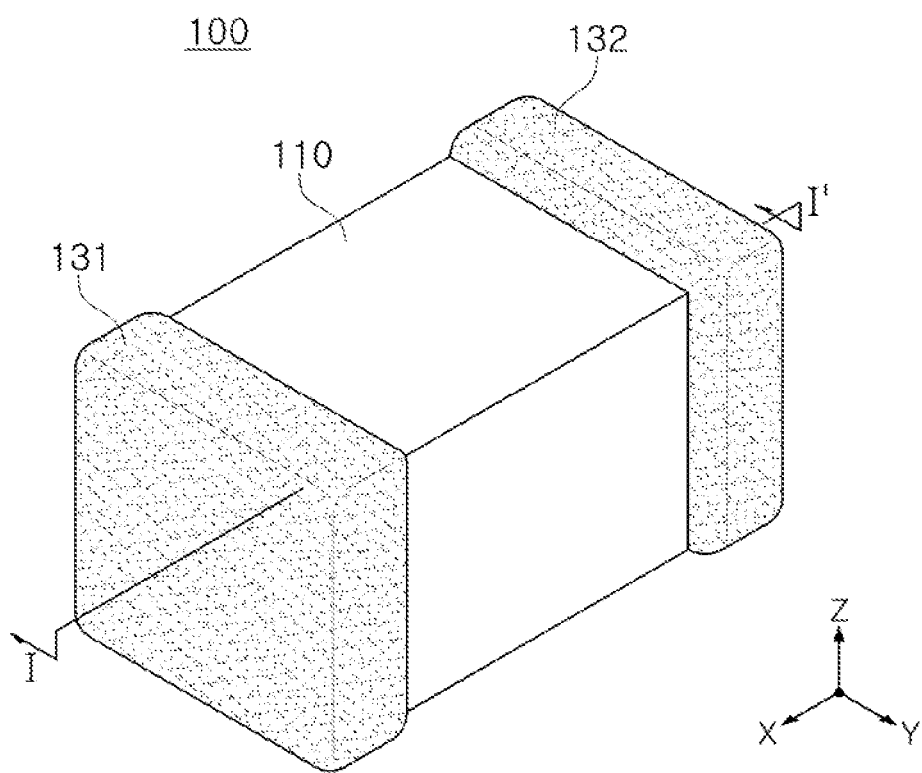
FIG. 1 is a perspective view illustrating a multilayer ceramic capacitor according to an embodiment of the present disclosure.
Figure 2:
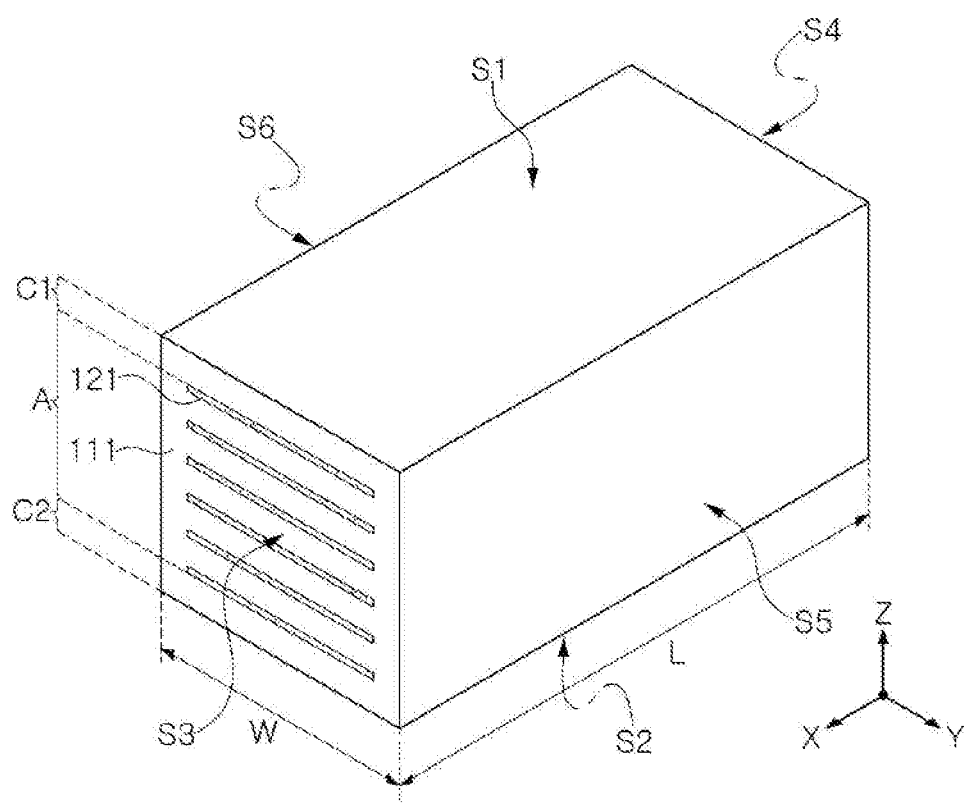
FIG. 2 is a schematic view illustrating a ceramic body according to an embodiment of the present disclosure.
Figure 3:
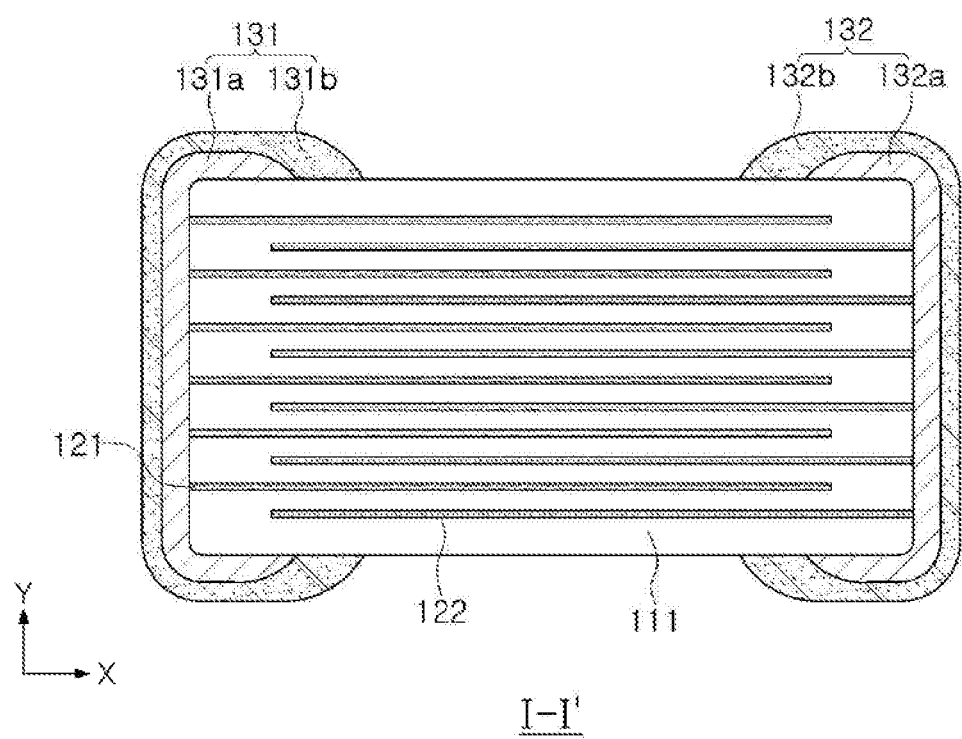
FIG. 3 is a cross-sectional view taken along line I-I' of FIG. 1.
Figure 4A:
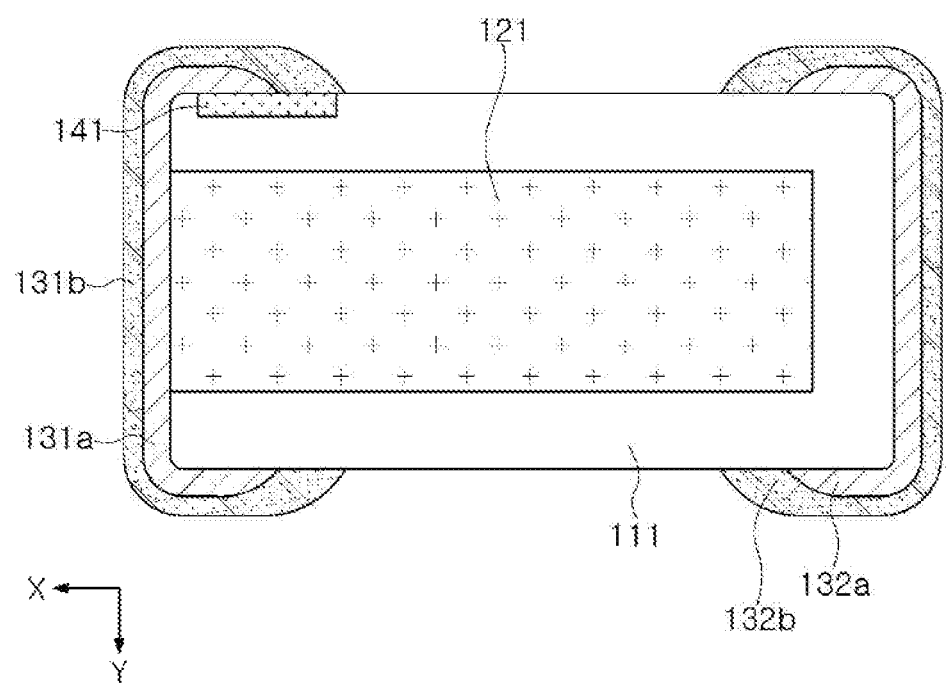
FIGS. 4A and 4B are plan views illustrating first and second internal electrodes applied to a multilayer ceramic electronic component according to an embodiment of the present disclosure, respectively.
Figure 4B:
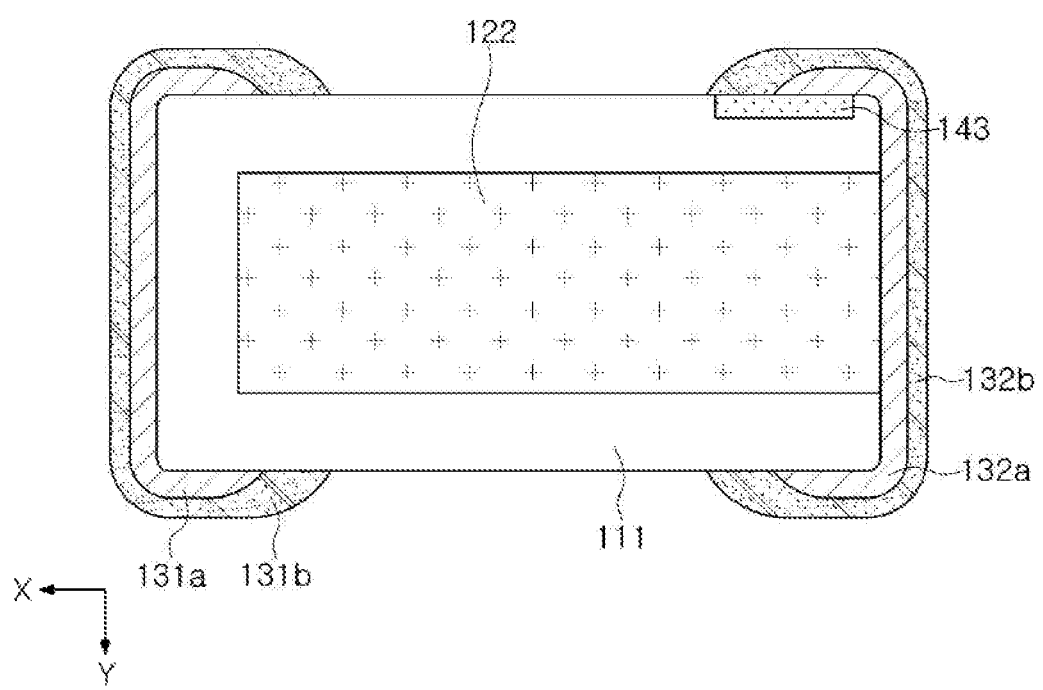

Hereinafter, embodiments of the present disclosure may be modified to have various other forms, and the scope of the present disclosure is not limited to the embodiments described below. Further, embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

Throughout the specification, when an element is referred to as "comprising", it means that it may include other elements as well, rather than excluding other elements, unless specifically stated otherwise.

In order to clearly illustrate the present disclosure, portions not related to the description are omitted, and thicknesses are enlarged in order to clearly represent layers and regions, and similar portions having the same functions within the same scope are denoted by similar reference numerals throughout the specification.

Hereinafter, preferred embodiments of the present disclosure will be described with reference to the accompanying drawings.

Hereinafter, a multilayer ceramic electronic component according to an embodiment of the present disclosure will be described and a stacked ceramic capacitor will be described, but the present disclosure may not be limited thereto.

In the multilayer ceramic capacitor according to an embodiment of the present disclosure, a 'longitudinal direction' may be defined as an 'X' direction or a 'second' direction in FIG. 1, a 'width direction' may be defined as a 'Y' direction or a 'third' direction in FIG. 1, and a 'thickness direction' may be defined as a 'Z' direction or a 'first' direction in FIG. 1. Here, the 'thickness direction' may be used in the same sense as the direction in which the dielectric layers are stacked up, e.g., as a 'layering direction' or 'stacking direction.'

In an embodiment of the present disclosure, a shape of the ceramic body 110 is not particularly limited, but may be a hexahedral shape, as illustrated.

The ceramic body 110 may include a first surface S1 and a second surface S2 opposing each other in a first direction, a third surface S3 and a fourth surface S4 connected to the first surface S1 and the second surface S2 and opposing each other in a second direction, and a fifth surface S5 and a sixth surface S6 connected to the first to fourth surfaces and opposing each other in a third direction.

The first surface S1 and the second surface S2 may be defined as surfaces opposing each other in the first direction, e.g. the thickness direction of the ceramic body 110. The third surface S3 and the fourth surface S4 may be defined as surfaces opposing each other in the second direction, e.g. the length direction, while the fifth surface S5 and the sixth surface S6 may be defined as surfaces opposing each other in the third direction, e.g. the width direction.

Referring to FIGS. 1 to 4, a multilayer ceramic electronic device 100 according to an embodiment of the present disclosure may include a ceramic body 110 including a dielectric layer 111, and first and second internal electrodes 121 and 122 disposed to oppose each other with the dielectric layer 111 interposed therebetween, and including a first surface S1 and a second surface S2 opposing each other in a stacking direction of the first and second internal electrodes 121 and 122, a third surface S3 and a fourth surface S4 connected to the first and second surfaces S1 and S2 and opposing each other, and a fifth surface S5 and a sixth surface S6 connected to the first and second surfaces S1 and S2, connected to the third and fourth surfaces S3 and S4, and opposing each other; first and second external electrodes 131 and 132 having first electrode layers 131a and 132a electrically connected to the first and second internal electrodes 121 and 122, respectively, and second electrode layers 131b and 132b disposed on the first electrode layers 131a and 132a, respectively; and auxiliary electrodes 141, 142, 143, and 144 disposed between an end portion of each of the second electrode layers 131b and 132b and an inflection point of the ceramic body.

In this case, a dimension (d1) of each of the auxiliary electrodes 141, 142, 143, and 144 taken in a width direction is in a range of 20 to 70% of a dimension (d2) of a margin portion of the first or second internal electrode 121 or 122 taken in the width direction.

Each end of the plurality of internal electrodes 121 and 122 formed in the ceramic body 110 may be exposed to the third surface S3 or the fourth surface S4 of the ceramic body. The internal electrodes 121 and 122 may have a pair of first internal electrodes 121 and second internal electrodes 122 having different polarities. One end of the first internal electrode 121 may be exposed to the third surface S3, and one end of the second internal electrode 122 may be exposed to the fourth surface S4. The other ends of the first internal electrode 121 and the second internal electrode 122 may be formed at regular intervals from the fourth surface S4 or the third surface S3. More specific details will be described later.

The first and second external electrodes 131 and 132 may be formed on the third surface S3 and the fourth surface S4 of the ceramic body to be connected to the internal electrodes.

According to an embodiment of the present disclosure, a raw material for forming the dielectric layer 111 is not particularly limited, as long as a sufficient electrostatic capacity may be obtained therewith. For example, a barium titanate-based material, a lead composite perovskite-based material, strontium titanate-based material, or the like may be used.

A variety of ceramic additives, organic solvents, plasticizers, binders, dispersants, and the like may, as a material for forming the dielectric layer 111, be added to powder particle of barium titanate ($BaTiO_3$), and the like, depending on the purpose of the present disclosure.

The ceramic body 110 may include an active portion A serving as a portion contributing to capacity formation of the capacitor, and an upper cover portion C1 and a lower cover portion C2 formed respectively above and below the active portion A as upper and lower margin portions.

The active portion A may be formed by repeatedly stacking the plurality of first and second inner electrodes 121 and 122 with the dielectric layer 111 interposed therebetween.

The upper cover portion C1 and the lower cover portion C2 may have the same material and configuration as the dielectric layer 111, except that they do not include internal electrodes.

For example, the upper cover portion C1 and the lower cover portion C2 may include a ceramic material, for example, a barium titanate ($BaTiO_3$) based ceramic material.

The upper cover portion C1 and the lower cover portion C2 may be formed by stacking a single dielectric layer or two or more dielectric layers on upper and lower surfaces of the active portion A in the vertical direction, respectively, and may function to basically prevent the internal electrodes from being damaged by physical or chemical stress.

A material forming the first and second internal electrodes 121 and 122 is not particularly limited, and may be formed using a conductive paste including one or more materials among silver (Ag), lead (Pb), platinum (Pt), nickel (Ni), and copper (Cu).

A multilayer ceramic capacitor according to an embodiment of the present disclosure may include a first external electrode 131 connected to the first internal electrode 121, and a second external electrode 132 connected to the second internal electrode 122.

The first and second external electrodes 131 and 132 may be connected to the first and second internal electrodes 121 and 122 for formation of electrostatic capacitance, and the second external electrode 132 may be connected to a potential different from that of the first external electrode 131.

The first and second external electrodes 131 and 132 may be respectively disposed on the third surface S3 and the fourth surface S4 in the length direction, the second direction of the ceramic body 110, and may extend onto and be disposed on the first surface S1 and the second surface S2 in the thickness direction, the first direction of the ceramic body 110, and the fifth surface S5 and the sixth surface S6 in the width direction, the third direction of the ceramic body 110.

According to an embodiment of the present disclosure, the external electrodes 131 and 132 may be disposed to cover the third surface S3 and the fourth surface S4 of the ceramic body 110, and may include first electrode layers 131a and 132a connected to the internal electrodes 121 and 122, and second electrode layers 131b and 132b disposed on the first electrode layers 131a and 132a.

Specifically, the first external electrode 131 may include the first electrode layer 131a disposed on the third surface S3 of the ceramic body 110, and a second electrode layer 131b disposed to cover the first electrode layer 131a and connected to the first internal electrode 121.

The second external electrode 132 may include the first electrode layer 132a disposed on the fourth surface S4 of the ceramic body 110, and a second electrode layer 132b disposed to cover the first electrode layer 132a and connected to the second internal electrode 122.

The first electrode layers 131a and 132a may include a conductive metal and a glass. The conductive metal used for the first electrode layers 131a and 132a is not particularly limited as long as it is a material that may be connected to the internal electrodes for the formation of electrostatic capacitance, and may be, for example, one or more selected from the group consisting of copper (Cu), silver (Ag), nickel (Ni), and alloys thereof.

The first electrode layers 131a and 132a may be formed by applying a conductive paste prepared by adding glass frit to a conductive metal powder and then sintering the conductive paste. The first electrode layers 131a and 132a may extend onto and be disposed on the first surface S1, the second surface S2, the fifth surface S5, and the sixth surface S6 of the ceramic body 110.

The second electrode layers 131b and 132b may include a conductive metal and a glass. The second electrode layers 131b and 132b may be formed on the first electrode layers 131a and 132a, and may be formed to completely cover the first electrode layers 131a and 132a.

The conductive metal used for the second electrode layers 131b and 132b is not particularly limited as long as it is a material that may be connected to the internal electrodes for the formation of electrostatic capacitance, and may be, for example, one or more selected from the group consisting of copper (Cu), silver (Ag), nickel (Ni), and alloys thereof. The second electrode layers 131b and 132b may be formed by applying a conductive paste prepared by adding glass frit to a conductive metal powder and then sintering the conductive paste.

According to an embodiment of the present disclosure, the second electrode layers 131b and 132b may include a conductive metal different from the first electrode layers 131a and 132a.

The first electrode layers 131a and 132a may include nickel (Ni) or a nickel (Ni)-copper (Cu) alloy. In this case, the second electrode layers 131b and 132b may include copper (Cu). Therefore, the conductive metal included in the second electrode layers 131b and 132b and the conductive metal included in the first electrode layers 131a and 132a may be different from each other.

In a case in which the second electrode layers 131b and 132b include conductive metals different from the first electrode layers 131a and 132a, even when the external electrode is peeled off due to external stress or the like, the second electrode layer may be peeled off first, to improve reliability for moisture resistance.

Figure 5:
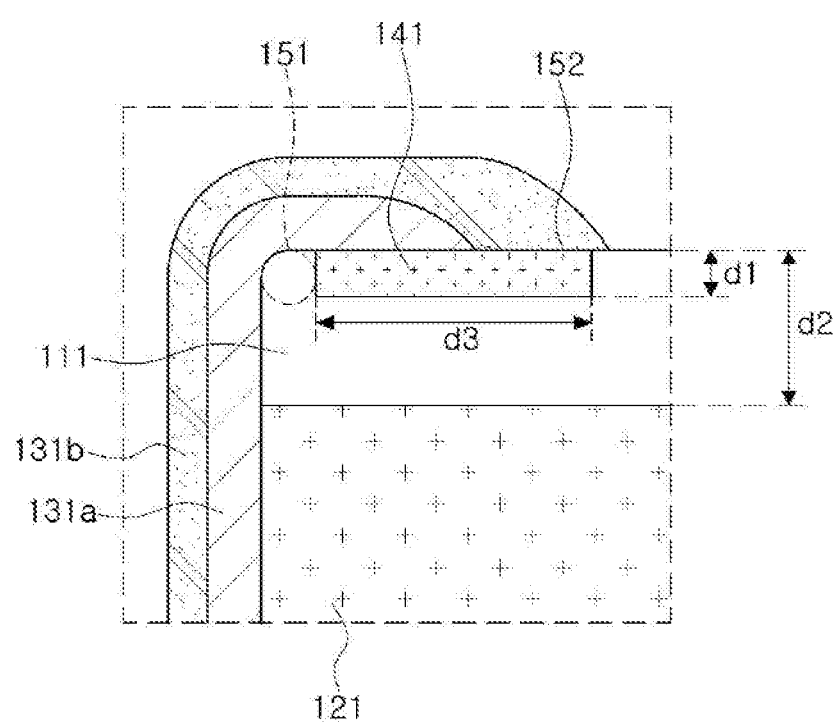
FIG. 5 is an enlarged view of the auxiliary electrode of FIG. 4A.
Figure 6A:
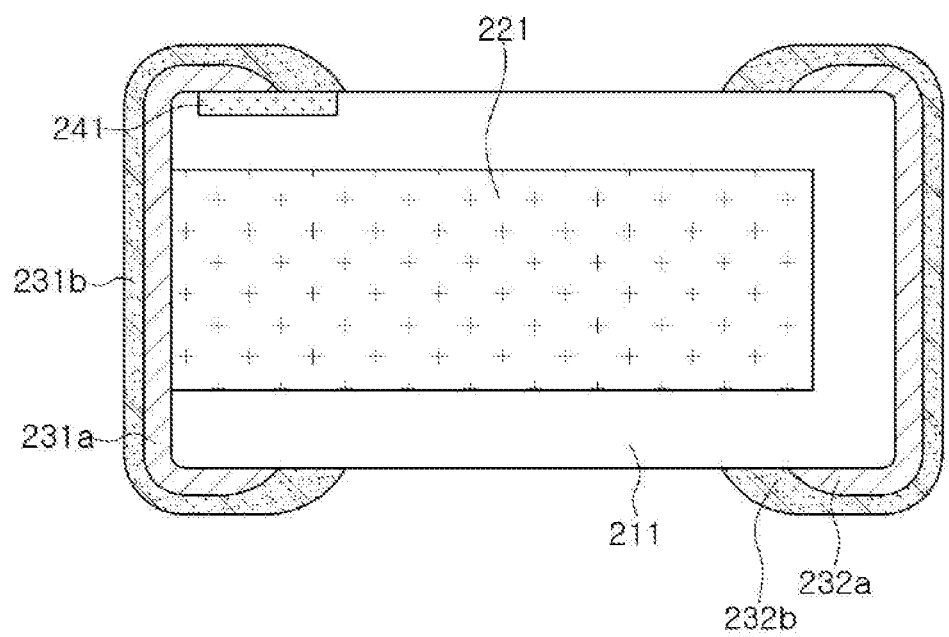
Figure 6B:
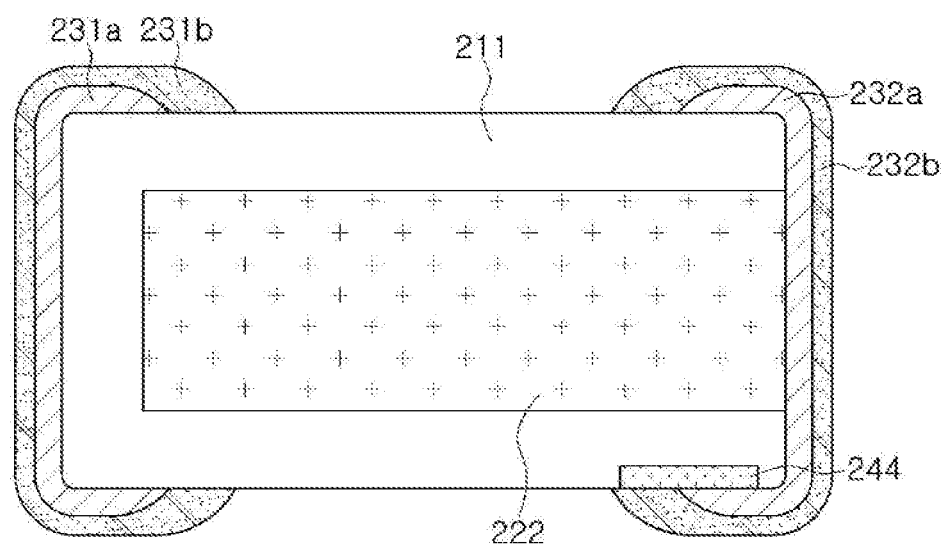
Figure 7A:
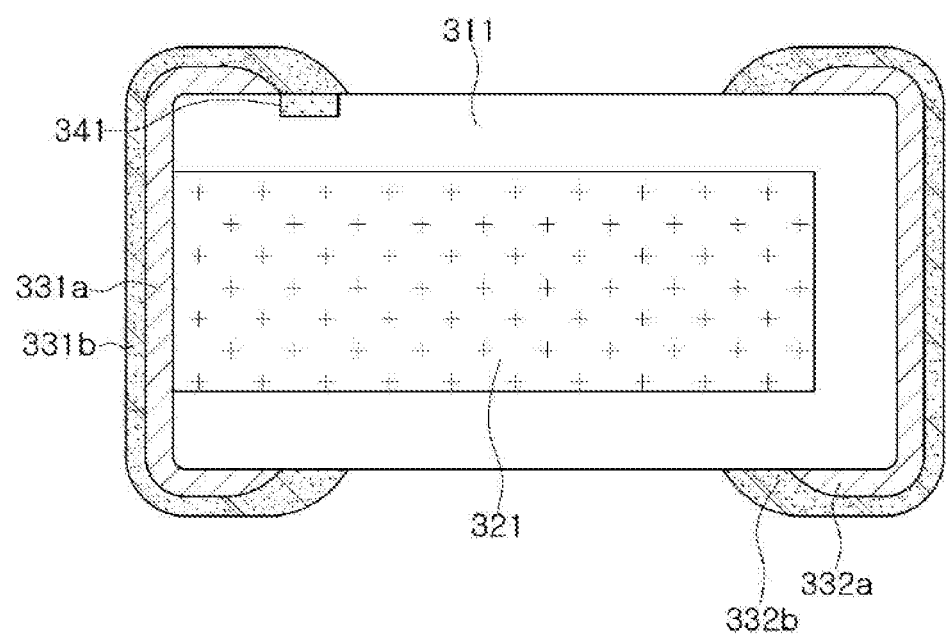
Figure 7B:
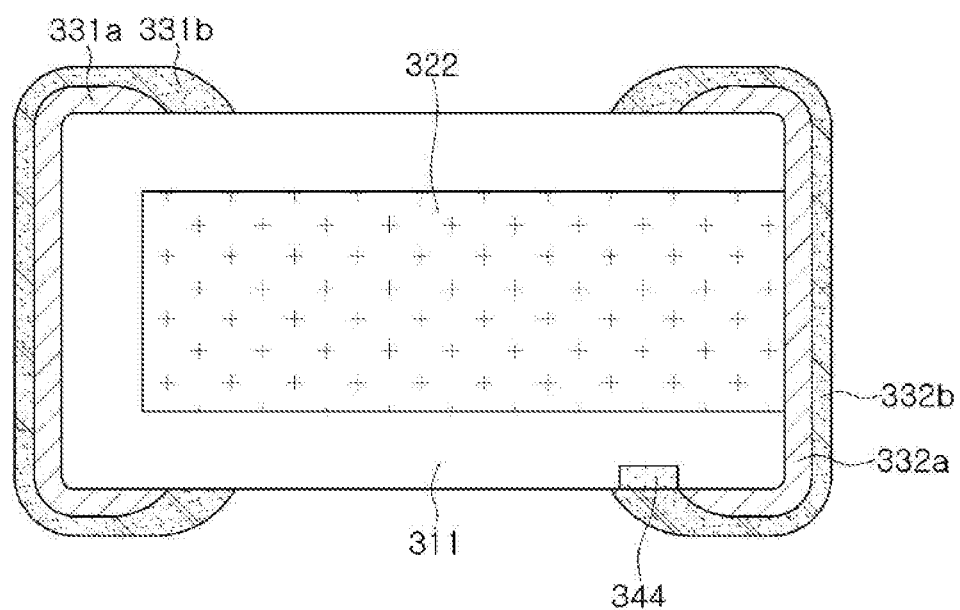
Figure 8A:
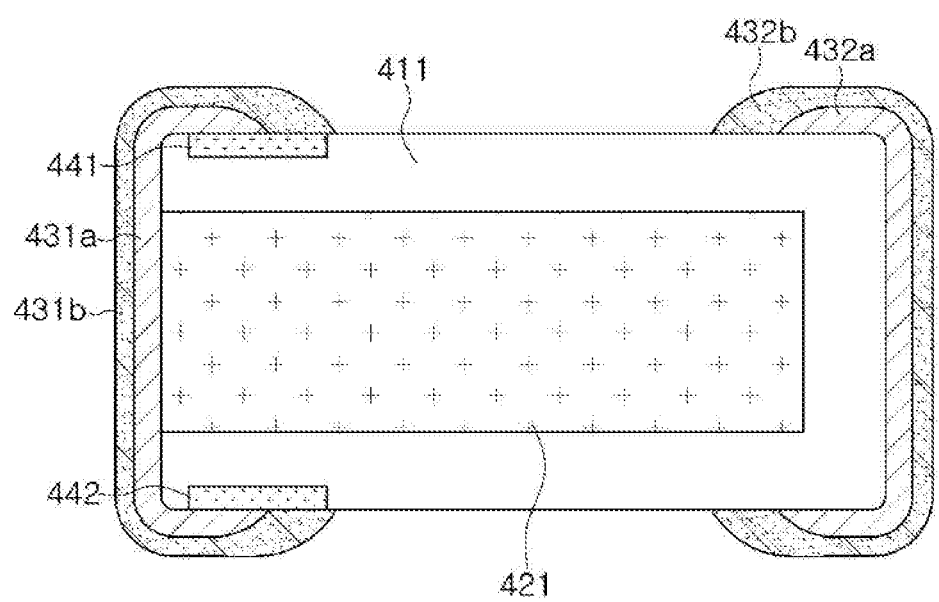
Figure 8B:
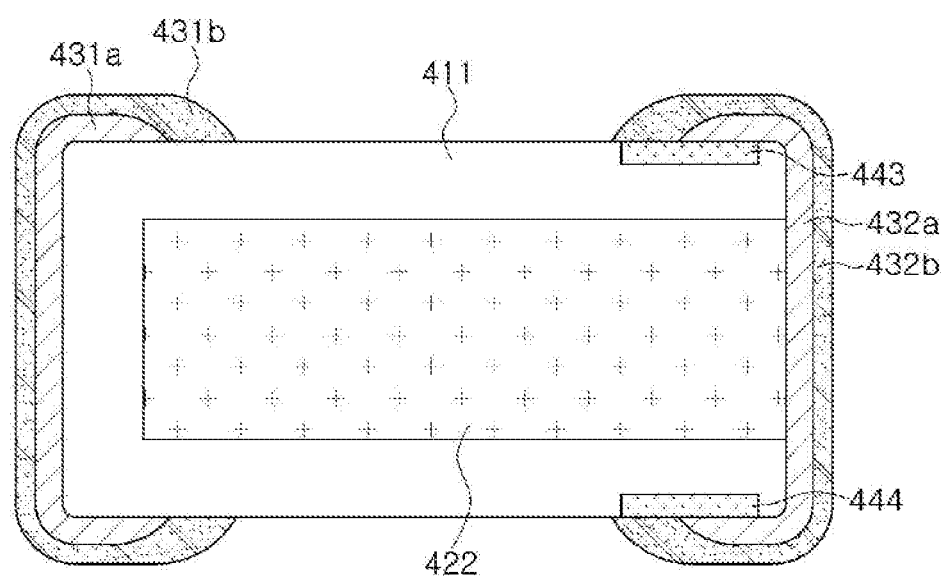
Figure 9A:
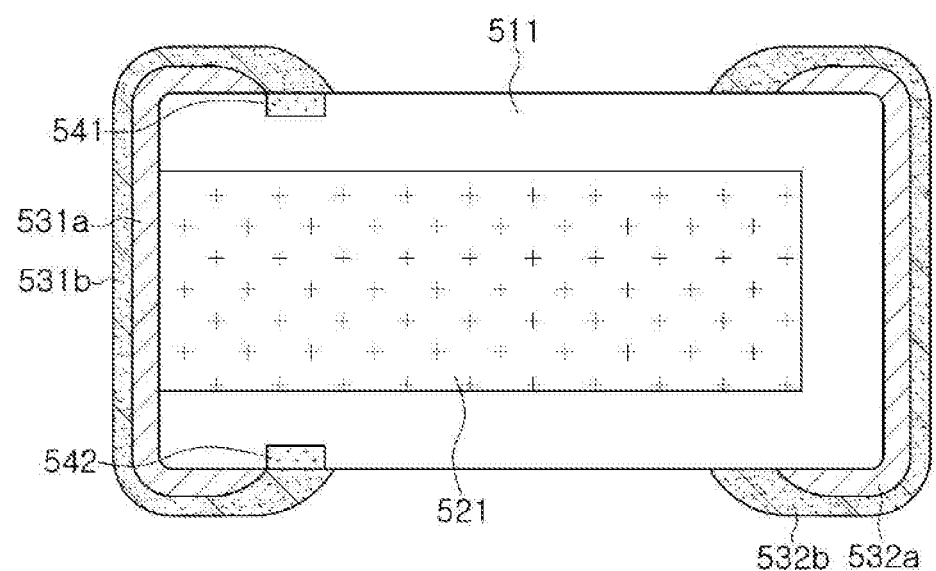
Figure 9B:
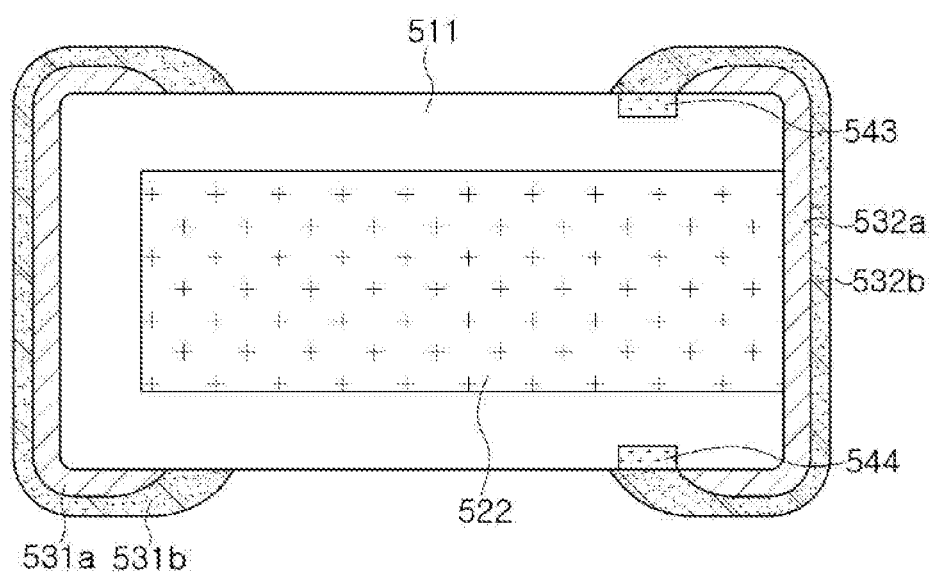

In an embodiment of the present disclosure, the auxiliary electrodes 141, 142, 143, and 144 may be disposed between the end portion of the second electrode layer and the inflection point of the ceramic body. The end portion of the second electrode layer may refer to an end portion of a point at which the ceramic body and the second electrode layer meet, and may refer to the end portion of the external electrode formed on the ceramic body. In this specification, the inflection point may refer to a point at which a straight linear shape and a round shape meet, and may refer to a point at which a straight line ends. Referring to FIG. 5, the inflection point may refer to a point 151 at which the straight linear shape of the sixth surface of the body ends.

In an embodiment of the present disclosure, a dimension of the auxiliary electrode taken in the width (or Y) direction (referred to herein as width of the auxiliary electrode) may be in the range from 20% to 70% of a width of the margin of the first or second internal electrode. Referring to FIG. 5, a width (d1) of the auxiliary electrode may be a distance in the Y direction of the auxiliary electrode. A width (d2) of the margin of the first or second internal electrode may refer to a width of the dielectric layer on which the internal electrode is not disposed, and may refer to a width of the margin portion of the first and second lines, when the margin portion is disposed on both sides with respect to one internal electrode. When the width (d1) of the auxiliary electrodes 141, 142, 143, and 144 is less than 20% of the width (d2) of the margin portion of the first or second internal electrodes 121 and 122, there is a possibility that a chip in which an auxiliary electrode is not disposed is generated due to a cutting deviation or the like. When the width (d1) of the auxiliary electrodes 141, 142, 143, and 144 is more than 70% of the width (d2) of the margin portion of the first or second internal electrodes 121 and 122, it may be connected to the effective internal electrode due to printing dispersion and/or blurring, to deteriorate the reliability for moisture resistance.

In one example, the auxiliary electrode may be disposed in the same layer as the first internal electrode or the second internal electrode. The fact that the auxiliary electrode is disposed in the same layer as the first internal electrode or the second internal electrode means that a surface on which the auxiliary electrode is disposed is identical to a surface on which the first or second internal electrode is disposed. In a case in which the auxiliary electrode is disposed on the same layer as the first internal electrode or the second internal electrode, the auxiliary electrode may be formed by applying the conductive paste, when forming the internal electrode, and, in this case, there is no need for a separate electrode forming process, thereby reducing manufacturing costs.

In an embodiment of the present disclosure, the auxiliary electrode may be disposed in a single layer among layers in which the internal electrode, closest to the first surface or the second surface of the ceramic body, is disposed. The fact that the auxiliary electrode is disposed in the layer in which the internal electrode, closest to the first surface or the second surface of the ceramic body, is disposed means that the auxiliary electrode is disposed in the layer in which the outermost internal electrode with respect to the stacking direction of the ceramic body is disposed. When the auxiliary electrode is disposed in a single layer among layers in which the outermost internal electrode with respect to the stacking direction of the ceramic body is disposed, the reliability for moisture resistance may be improved by increasing mechanical strength of the ceramic body in a portion in which moisture penetration and/or cracking occur in a mounting direction.

According to an embodiment of the present disclosure, the auxiliary electrode may include a first auxiliary electrode and a second auxiliary electrode. In this case, the number of auxiliary electrodes may be two or more. When the auxiliary electrode includes the first auxiliary electrode and the second auxiliary electrode, the first auxiliary electrode and the second auxiliary electrode may be arranged on the same layer or on different layers.

Figure 10:
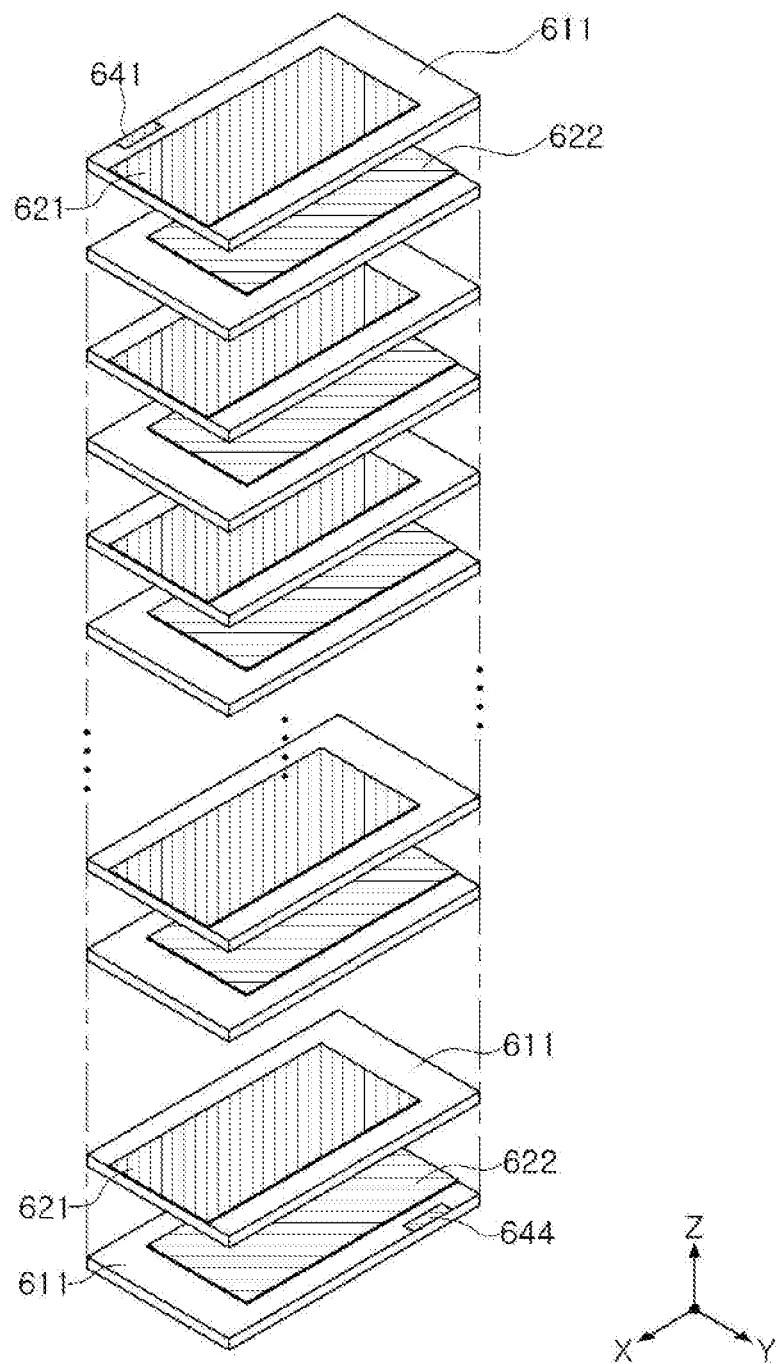
FIG. 10 is a schematic view illustrating an internal electrode of a multilayer ceramic electronic component according to an embodiment of the present disclosure.

In another embodiment of the present disclosure, the auxiliary electrode may include a first auxiliary electrode and a second auxiliary electrode, and the first auxiliary electrode and the second auxiliary electrode may be formed in the layer in which the internal electrode, closest to the first and second surfaces of the body, is disposed. The fact that the first auxiliary electrode and the second auxiliary electrode are disposed in the layer in which the internal electrode, closest to the first and second surfaces of the body, is disposed means that each of the auxiliary electrodes is disposed in two layers in which the outermost internal electrode with respect to the stacking direction of the ceramic body is disposed. Referring to FIG. 10, a first auxiliary electrode 641 and a second auxiliary electrode 644 may be disposed in a layer in which the internal electrode, closest to the first and second surfaces of the ceramic body, is disposed. Since the auxiliary electrodes are disposed in two layers in which the outermost internal electrode with respect to the stacking direction of the ceramic body is disposed, the mechanical strength of the ceramic body may be improved, irrespective of the mounting direction, and reliability for moisture resistance may be further improved.

In another embodiment of the present disclosure, the auxiliary electrode may include a first auxiliary electrode, a second auxiliary electrode, a third auxiliary electrode, and a fourth auxiliary electrode. In this case, the first and second auxiliary electrodes may be disposed in a layer in which the first internal electrode, closest to the first surface or the second surface of the body, is disposed, and the third and fourth auxiliary electrodes may be disposed in a layer in which the second internal electrode, closest to the first surface or the second surface of the body, is disposed. Since this embodiment may have a structure in which two auxiliary electrodes are disposed in two layers in which the outermost internal electrodes with respect to the stacking direction of the ceramic body are arranged, the mechanical strength of the multilayer ceramic electronic component may be improved irrespective of influence of the mounting direction of the multilayer ceramic electronic component, directions of an external force, or the like, thereby further improving the reliability for moisture resistance.

Figure 11:
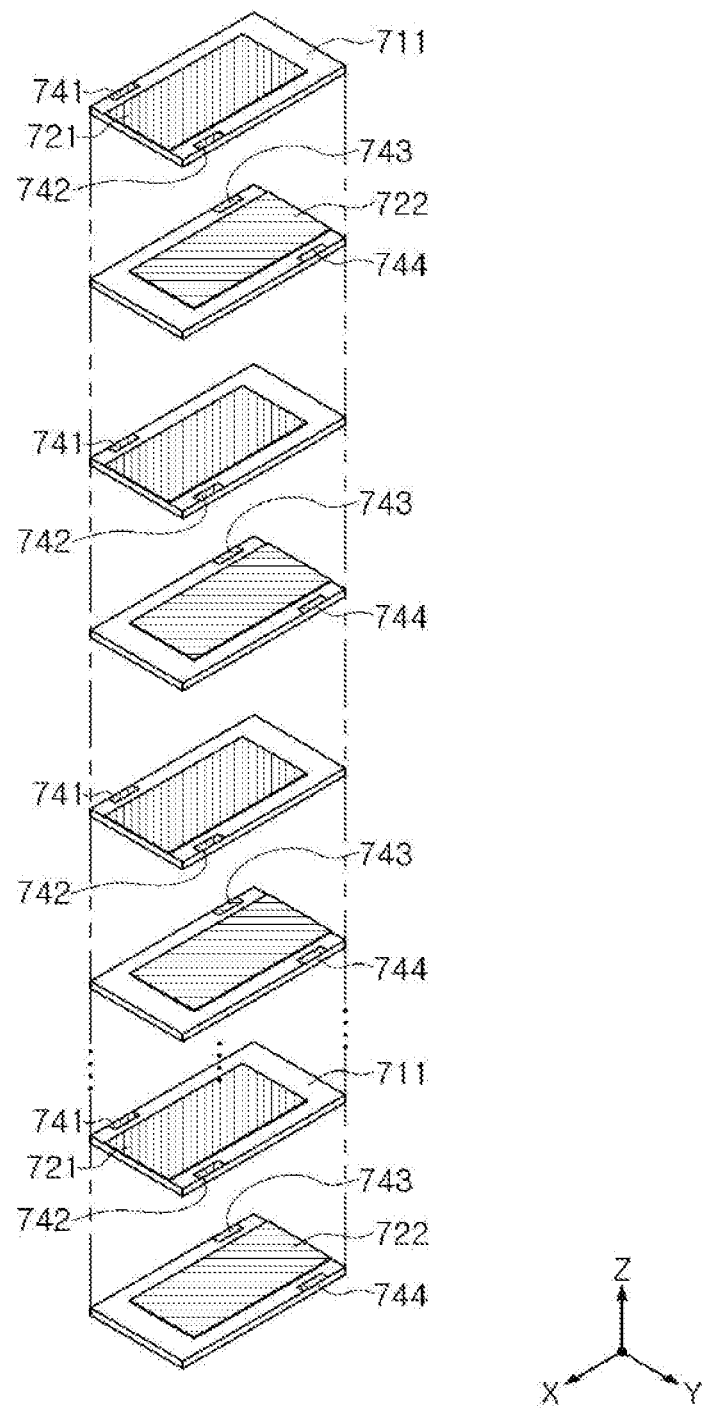
FIG. 11 is a schematic view illustrating an internal electrode of a multilayer ceramic electronic component according to another embodiment of the present disclosure.

In another embodiment of the present disclosure, the auxiliary electrode may include a first auxiliary electrode, a second auxiliary electrode, a third auxiliary electrode, and a fourth auxiliary electrode. In this case, the first and second auxiliary electrodes may be respectively disposed in a layer in which the first internal electrode is disposed, and the third and fourth auxiliary electrodes may be respectively disposed in a layer in which the second internal electrode is disposed. The fact that the first and second auxiliary electrodes are respectively disposed in a layer in which the first internal electrode is disposed, and the third and fourth auxiliary electrodes are respectively disposed in a layer in which the second internal electrode is disposed means that two auxiliary electrodes are respectively arranged in all layers in which the internal electrode is formed. FIG. 11 is a schematic view illustrating auxiliary electrodes of this embodiment. Referring to FIG. 11, first and second auxiliary electrodes 741 and 742 may be respectively disposed in a layer in which a first internal electrode 721 is disposed, and third and fourth auxiliary electrodes 743 and 744 may be respectively disposed in a layer in which a second internal electrode 722 is disposed.

As in this embodiment, when two auxiliary electrodes are respectively disposed in two layers in which the internal electrodes are disposed, it is possible to realize a multilayer ceramic electronic component having a relatively high strength. In addition, since it is possible to strongly fix an end portion of the external electrode, which is liable to permeate with an external substance such as moisture and the like, the reliability for moisture resistance may be improved. In particular, even when peeling occurs in the second electrode layer of the external electrode in a harsh environment such as a very strong external force, the first electrode layer may be strongly bonded to the ceramic body through the auxiliary electrode. Therefore, progress of the peeling may be suppressed, and very excellent moisture resistance characteristic may be realized.

Hereinafter, a method of manufacturing a multilayer ceramic electronic component according to an embodiment of the present disclosure will be described, but the present disclosure is not limited thereto.

In the method of manufacturing a multilayer ceramic electronic component according to an embodiment of the present disclosure, a slurry formed by including a powder such as barium titanate ($BaTiO_3$) may be coated on a carrier film, and may be dried to form a plurality of ceramic green sheets, whereby a dielectric layer may be formed.

The ceramic green sheet may be prepared by mixing a ceramic powder, a binder, and a solvent to prepare a slurry, and the slurry may be formed as a sheet having a thickness of several micrometers by a doctor blade method.

Next, an internal electrode conductive paste containing nickel powder having an average nickel particle size of 0.1 μm to 0.2 μm and 40 to 50 parts by weight may be provided.

The internal electrode conductive paste was applied on the green sheet by a screen-printing method to form internal electrodes, and a green sheet having internal electrode patterns arranged thereon was stacked to form a ceramic body 110.

In this case, the desired number of the auxiliary electrodes at a desired position may be printed using the conductive paste for the internal electrode, and the auxiliary electrode may be disposed on the same layer as the internal electrode.

Next, first electrode layers 131a and 132a including one or more conductive metals selected from the group consisting of copper (Cu), silver (Ag), nickel (Ni), and alloys thereof, and glass, may be formed an external surface of the ceramic body 110.

The glass is not particularly limited, and a material having the same composition as glass used for manufacturing an external electrode of a conventional multilayer ceramic capacitor may be used.

The first electrode layers 131a and 132a may be formed on upper and lower surfaces, and ends of the ceramic body to be connected to the first and second internal electrodes 121 and 122, respectively.

The second electrode layers 131a and 132a including at least one conductive metal selected from the group consisting of nickel (Ni) or a nickel (Ni)-copper (Cu) alloy, and glass, to cover the first electrode layers 131a and 132a, may be formed.

The glass is not particularly limited, and a material having the same composition as glass used for manufacturing an external electrode of a conventional multilayer ceramic capacitor may be used.

The second electrode layers 131b and 132b may contain 5 vol % or more of glass, compared to the conductive metal.

Table 1 below shows the results of the reliability test for moisture resistance with respect to a ratio of a width of the auxiliary electrode to a width of the margin portion of the first or second internal electrode. The reliability for moisture resistance was investigated when a voltage of 2 Vr was applied for 48 hours at a temperature of 85° C. and a relative humidity of 85%, and the number of stacked ceramic electronic components in which defects occurred in 400 samples was investigated.

TABLE 1

| Width of Auxiliary Electrode | 85° C., 85%, 48 HR Test | | | | | |
|---|---|---|---|---|---|---|
| | a LOT | b LOT | c LOT | d LOT | e LOT | |
| 80% | 0/400 | 1/400 | 0/400 | 0/400 | 2/400 | Increase in Defects |
| 70% | 0/400 | 0/400 | 0/400 | 0/400 | 0/400 | No Defect |
| 50% | 0/400 | 0/400 | 0/400 | 0/400 | 0/400 | No Defect |
| 20% | 0/400 | 0/400 | 0/400 | 0/400 | 0/400 | No Defect |
| 10% | 0/400 | 0/400 | 2/400 | 0/400 | 2/400 | Occurrence in Defect & Erroneous Cut |
| 0% | 0/400 | 0/400 | 3/400 | 4/400 | 4/400 | Increase in Defects |

Referring to Table 1, it can be seen that no defective component occurred at all, when the ratios of the width of the auxiliary electrode to the width of the margin portion of the first or second internal electrode were increased from 10% to 20%. It can be seen that a defective component occurred, when the ratio exceeds 70%. Therefore, it can be seen that a width of the auxiliary electrode of the present disclosure should be within a range of 20% to 70% of the margin portion of the internal electrode.

According to an embodiment of the present disclosure, a multilayer ceramic electronic component having improved mechanical strength may be provided by applying an auxiliary electrode.

According to another embodiment of the present disclosure, it is possible to provide a multilayer ceramic electronic component capable of preventing moisture penetration even when some peeling or the like occurs in the external electrode by applying an auxiliary electrode.

According to another embodiment of the present disclosure, an external electrode including a first electrode layer and a second electrode layer, and an auxiliary electrode may be applied to enhance reliability in a moisture-resistant environment.

While example embodiments have been shown and described above, it will be apparent to those skilled in the art that modifications and variations could be made without departing from the scope of the present disclosure as defined by the appended claims.

What is claimed is:

1. A multilayer ceramic electronic component comprising:
a ceramic body including a dielectric layer, and first and second internal electrodes disposed to oppose each other with the dielectric layer therebetween, and including first and second surfaces opposing each other in a stacking direction of the first and second internal electrodes, third and fourth surfaces connected to the first and second surfaces and opposing each other, and fifth and sixth surfaces connected to the first and second surfaces, connected to the third and fourth surfaces, and opposing each other;

first and second external electrodes having first electrode layers connected to the first and second internal electrodes, respectively, and second electrode layers disposed on the first electrode layers, respectively, the first and second external electrodes being disposed on length-wise opposing surfaces of the ceramic body; and an auxiliary electrode disposed between an end portion of the second electrode layers and an inflection point of the ceramic body, wherein a dimension in a width direction of the auxiliary electrode is in a range from 20% to 70% of a dimension in the width direction of a margin portion of the first or second internal electrode, wherein the second electrode layers comprise a conductive paste including glass and conductive metal.

2. The multilayer ceramic electronic component according to claim 1, wherein the auxiliary electrode comprises a first auxiliary electrode and a second auxiliary electrode.

3. The multilayer ceramic electronic component according to claim 1, wherein the auxiliary electrode is disposed in the same layer as the first internal electrode or the second internal electrode.

4. The multilayer ceramic electronic component according to claim 1, wherein the auxiliary electrode is disposed in a single layer among layers in which an internal electrode, closest to the first surface or second surface of the ceramic body, is disposed.

5. The multilayer ceramic electronic component according to claim 2, wherein the first auxiliary electrode and the second auxiliary electrode are respectively disposed in layers in which an internal electrode, closest to the first surface or second surface of the ceramic body, is disposed.

6. The multilayer ceramic electronic component according to claim 2, wherein the auxiliary electrode further comprises a third auxiliary electrode and a fourth auxiliary electrode.

7. The multilayer ceramic electronic component according to claim 6, wherein the first and second auxiliary electrodes are arranged in a layer in which the first internal electrode, closest to the first or second surface of the ceramic body, is disposed, and the third and fourth auxiliary electrodes are arranged in a layer in which the second internal electrode, closest to the first or second surface of the ceramic body, is disposed.

8. The multilayer ceramic electronic component according to claim 6, wherein the first and second auxiliary electrodes are respectively arranged in a layer in which the first internal electrode, closest to the first and second surfaces of the ceramic body, is disposed, and the third and fourth auxiliary electrodes are respectively arranged in a layer in which the second internal electrode, closest to the first and second surfaces of the ceramic body, is disposed.

9. The multilayer ceramic electronic component according to claim 6, wherein the first and second auxiliary electrodes are respectively arranged in a layer in which the first internal electrode is disposed, and
the third and fourth auxiliary electrodes are respectively arranged in a layer in which the second internal electrodes are disposed.

10. The multilayer ceramic electronic component according to claim 1, wherein the second electrode layer comprises a conductive metal different from the first electrode layer.

11. The multilayer ceramic electronic component of claim 1, wherein second electrode layers completely cover the first electrode layers.

12. A multilayer ceramic electronic component comprising:
a body including first and second internal electrodes stacked over each other in a thickness direction with a dielectric layer interposed between each adjacent pair of first and second internal electrodes;
first and second external electrodes disposed on lengthwise opposing surfaces of the body, each comprising a first electrode layer and a second electrode layer disposed on the first electrode layer, the first electrode layer of each of the first and second external electrodes respectively connected to the first and second internal electrodes; and
an auxiliary electrode contacting at least a portion of the second electrode layer and disposed on a same layer as the first or the second internal electrodes between a portion of the second electrode layer contacting a surface of the body and one of the length-wise opposing surfaces to which a corresponding internal electrode is exposed,
wherein a dimension in a width direction of the auxiliary electrode is in a range from 20% to 70% of a dimension in the width direction of a margin portion of the corresponding internal electrode,
wherein the second electrode layers comprise a conductive paste including glass and conductive metal.

13. The multilayer ceramic electronic component of claim 12, wherein the dielectric layer on which the auxiliary electrode is disposed is closest to a surface of the body in a direction in which the first and second internal electrodes are stacked.

14. The multilayer ceramic electronic component of claim 12, wherein the auxiliary electrode comprises a first auxiliary electrode disposed on a same layer as a first internal electrode closest to a surface of the body in a direction in which the first and second internal electrodes are stacked, and a second auxiliary electrode disposed on a same layer as a second internal electrode closest to a surface of the body in the direction in which the first and second internal electrodes are stacked.

15. The multilayer ceramic electronic component of claim 12, wherein second electrode layer completely covers the first electrode layer.

16. A multilayer ceramic electronic component comprising:
a ceramic body including a dielectric layer, and first and second internal electrodes disposed to oppose each other with the dielectric layer therebetween, and including first and second surfaces opposing each other in a stacking direction of the first and second internal electrodes, third and fourth surfaces connected to the first and second surfaces and opposing each other, and fifth and sixth surfaces connected to the first and second surfaces, connected to the third and fourth surfaces, and opposing each other;
first and second external electrodes having first electrode layers connected to the first and second internal electrodes, respectively, and second electrode layers disposed on the first electrode layers, respectively, the first and second external electrodes being disposed on length-wise opposing surfaces of the ceramic body; and
an auxiliary electrode disposed between an end portion of the first electrode layers and an end portion of the second electrode layers,
wherein the second electrode layers comprise a conductive paste including glass and conductive metal.

* * * * *